(12) United States Patent
Chien (10) Patent No.: US 10,489,338 B1
(45) Date of Patent: Nov. 26, 2019

(54) METHOD AND SYSTEM FOR STREAMLINED SERVER DESIGN

(71) Applicant: QUANTA COMPUTER INC., Taoyuan (TW)

(72) Inventor: Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 16/122,387

(22) Filed: Sep. 5, 2018

(51) Int. Cl.
*G06F 13/42* (2006.01)
*G06F 13/16* (2006.01)

(52) U.S. Cl.
CPC ...... *G06F 13/4282* (2013.01); *G06F 13/1668* (2013.01); *G06F 2213/0026* (2013.01); *G06F 2213/0032* (2013.01)

(58) Field of Classification Search
CPC ............. G06F 13/4282; G06F 13/1668; G06F 2213/0026; G06F 13/0032
See application file for complete search history.

(56) References Cited

U.S. PATENT DOCUMENTS

| | | | |
|---|---|---|---|
| 9,122,501 B1 | 9/2015 | Hsu et al. | |
| 9,128,729 B1 * | 9/2015 | Hung | G06F 9/4403 |
| 9,710,284 B1 | 7/2017 | Huang et al. | |
| 2015/0286762 A1 * | 10/2015 | Sato | H03K 19/173 716/103 |
| 2015/0339130 A1 * | 11/2015 | Kruglick | G06F 9/44505 713/100 |
| 2017/0177380 A1 | 6/2017 | Yang | |
| 2017/0220802 A1 * | 8/2017 | Huang | G06F 21/575 |

OTHER PUBLICATIONS

Extended European Search Report for EP Application No. 19152132.7, dated May 8, 2019.

* cited by examiner

*Primary Examiner* — Henry Tsai
*Assistant Examiner* — John B Roche
(74) *Attorney, Agent, or Firm* — Nixon Peabody LLP; Zhou Lu (57) ABSTRACT

A system and method for allowing configuration of a baseboard for different types of servers is disclosed. Desired parameters and corresponding server identifications are stored in either a hardware or software straps structure in a firmware image. A board identification including a server product type is read from a memory on a baseboard. The server product type is compared the server identifications in the straps structure. The corresponding desired parameter is loaded to a baseboard component on the baseboard to perform a server function.

18 Claims, 10 Drawing Sheets

METHOD AND SYSTEM FOR STREAMLINED SERVER DESIGN

TECHNICAL FIELD

The present disclosure relates generally to efficient server configuration during manufacturing. More particularly, aspects of this disclosure relate to using a firmware image to allow efficient customization of servers during manufacturing without additional software or hardware modifications.

BACKGROUND

The emergence of the cloud for computing applications has increased the demand for off-site installations, known as data centers, that store data and run applications accessed by remotely connected computer device users. Such data centers typically have massive numbers of servers, switches, and storage devices to store and manage data. A typical data center has physical rack structures with attendant power and communication connections. The racks are arranged in rows throughout the room, or rooms, of the data center. Each rack may hold multiple network devices such as servers, switches, and storage devices. As different functions are requested by operators of data centers, specialized servers are required. Such specialized servers may include a storage server, a computing server, a graphic processing unit server, or a network switch server. Each type of server requires different setups of hardware and software.

Thus, hardware design of basic platforms for servers, such as a baseboard, usually requires consideration of a variety of uses and subsumes most server functions throughout. A baseboard is a circuit board that includes a baseboard management controller and components to support a variety of specialized mainboards with different functions. Such a server platform typically supports the best compatibility for different server deployment scenarios. Hence optimal hardware design of server platforms may contain multiplexer and data selector circuits on the server baseboard, to allow selection of different functions on specialized boards. Such circuits accommodate maximum variables and independent requirements. The designs use informal logic programming and controllers to select the correct circuit to fulfill each complete function. These variables and independent requirements are usually exclusively present and permanently enabled or disabled on a server. However, server platforms are not generally designed to allow modifications after a server has been shipped to a customer.

Recently, adaptable server platforms have been introduced that allow a customer to customize functions. Such adaptable server platforms may derive their adaptability from either the physical hardware component as a connector, a memory socket, or an IO peripheral slot, which can adopt more devices. Such platforms may also include options for a specific server function, which can be activated by sensing the setting of logic programming and a controller. Such mechanisms bring a flexible usage model to such adaptable server designs.

In order to achieve flexibility without increasing cost, the baseboard design of a server may reserve replaceable, added, and removable hardware circuits. Once a server design is scheduled for mass production, it may still have a variety of uses available to a customer. In such cases, the factory site may use a customer manifest to correctly build the desired functionality into a server by using the same baseboard design, but adjusting the settings of logic programming and the controller to configure the baseboard. Thus, factory production lines must have the provision of logic programming and controller configurations relying on the traditional Basic Input Output System (BIOS) and a baseboard management controller (BMC). These components are the principal firmware that are programed with the initial associated hardware configuration for the server. This saves time and money on production lines for designing, replacing and preparing different motherboards for different servers.

In general, setting logic programming and configuring a controller are based on fixed parameters of firmware and a static state of hardware signals. The fixed parameter could be a partition of a combination firmware image file which is built by the firmware designer of the baseboard. Such parameters may be stored in the non-volatile memory of the baseboard such as a Serial Peripheral Interface (SPI) flash chip. The static state of a hardware signal could be a signal output from a hardware logic circuit on the baseboard. However, if the variety of required servers increase, it becomes a complicated task to create a sufficient variety of combination firmware image files, and change the output of hardware logic circuits for a production line. Further, silicon based hardware devices can only recognize a single section of configuration parameters, such as those of the Intel Platform Controller Hub (PCH). Since configuration parameters of a PCH reside in a specific region of the combination firmware image file, a firmware designer must rebuild the combination firmware image file if either a specific function is activated or deactivated, or a configuration parameter of PCH is changed.

In general, the silicon vendor usually provides multiple functions inside its chipset and allows a developer to select and deploy functions with an associated hardware circuit on a server baseboard. The developer may decide what functions inside the chipset are active or inactive during the power on sequence of the baseboard. Once the functions are selected, the output pins of the chipset may go through an internal multiplexer and data selector to connect with an external hardware circuit. The chipset usually provides several mechanisms to identify what function should be active or inactive, such as those of the Intel Platform Controller Hub (PCH). Configuration parameters of the PCH reside in a specific region of the combination firmware image file. Such configuration parameters are termed "software straps."

Figure 1:
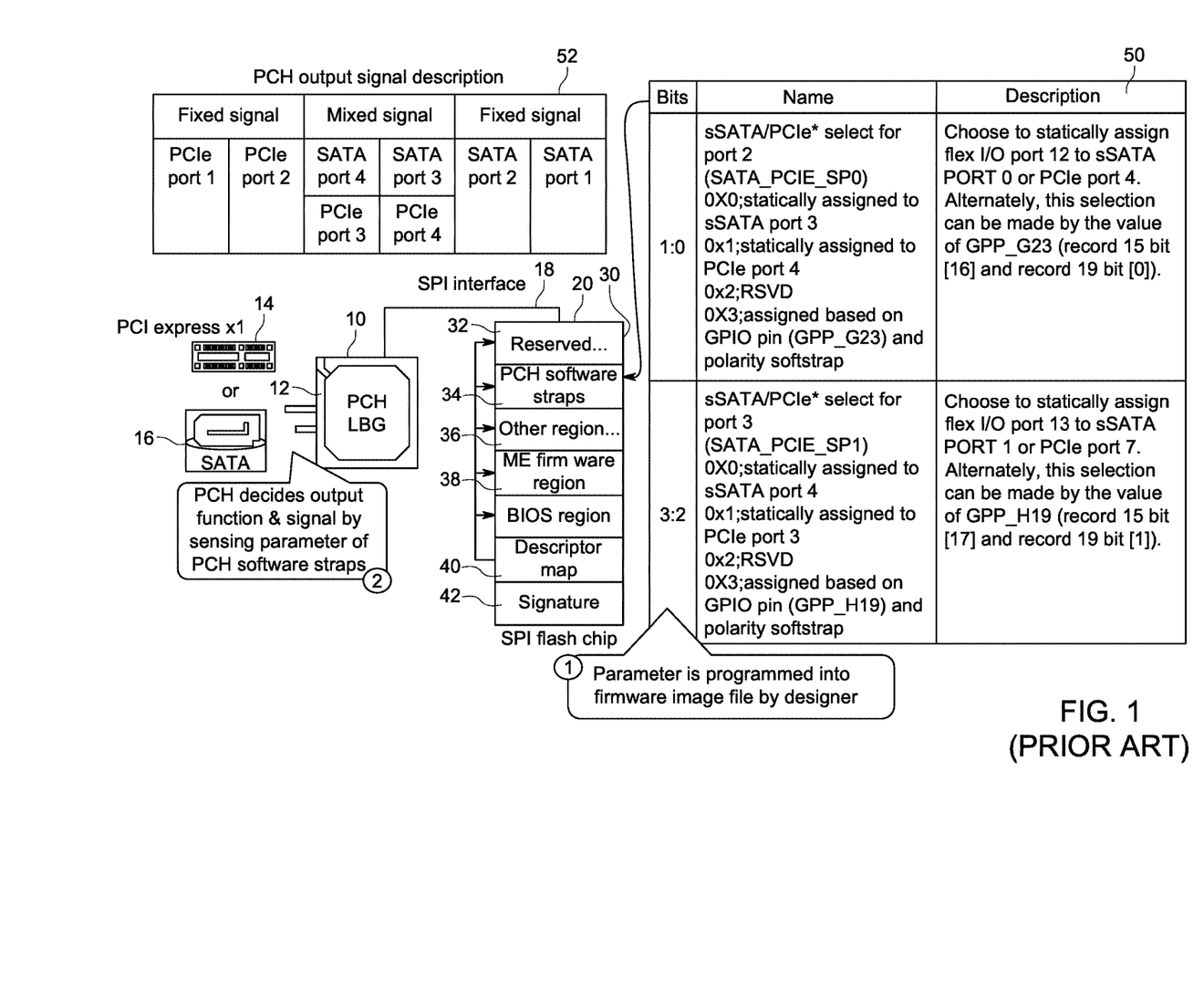
FIG. 1 is a block diagram showing the prior art installation of software straps for a server.

FIG. 1 shows a conventional process for selection of software straps. FIG. 1 includes a platform controller hub (PCH) chip 10. The PCH chip 10 has an internal SATA controller and an internal PCI root controller. The PCH chip 10 includes configuration parameter outputs 12 that may send parameter signals that are routed by either the internal SATA controller or internal PCI root controller. The parameter signals of the PCH chip 10 ultimately output configuration information for either a PCIe bus 14 or a SATA bus 16 depending on which controller is enabled. The parameters are termed software strap. The PCH 10 includes a SPI interface 18 that is coupled to a Serial Peripheral Interface (SPI) flash chip 20.

FIG. 1 shows a memory map 30 of a firmware image that is burned into the SPI flash chip 20. The memory map 30 includes a reserved region 32, a PCH software strap region 34, a reserved region 36, a BIOS region 38, a descriptor map region 40, and a signature region 42. The PCH software strap region 34 is shown as a table 50 that includes a bit location and the description of the bit fields and represents a software strap. In this example, the software strap in the table 50 includes selections for values for the parameter outputs 12 of the PCH chip 10. Thus, the table 50 is an example of parameters showing how the platform controller hub chip 10 routes one of the two internal controllers (sSATA or PCIe) to a single port output. It is similar to a multiplexer when selecting either one of the controllers to provide the output signal for enabling functions from either the internal PCI root controller or internal SATA controller to the respective PCIe bus 14 or SATA bus 16.

The resulting outputs of the parameter outputs 12 of the PCH 10 are shown in a table 52. As shown in table 52, the first two ports of the parameter outputs 12 are fixed signals. The third and fourth ports of the parameter outputs 12 may be multiplexed. The table 52 is an example of PCH silicon design. The two different controllers (sSATA & PCIe) are present in the platform controller hub chip 10, but the platform controller hub only provides a single port output that allows selection of either controller for connection. Only a multiplexed signal may provide an output port selection as opposed to a fixed signal that does not provide an output port selection option.

Figure 2:
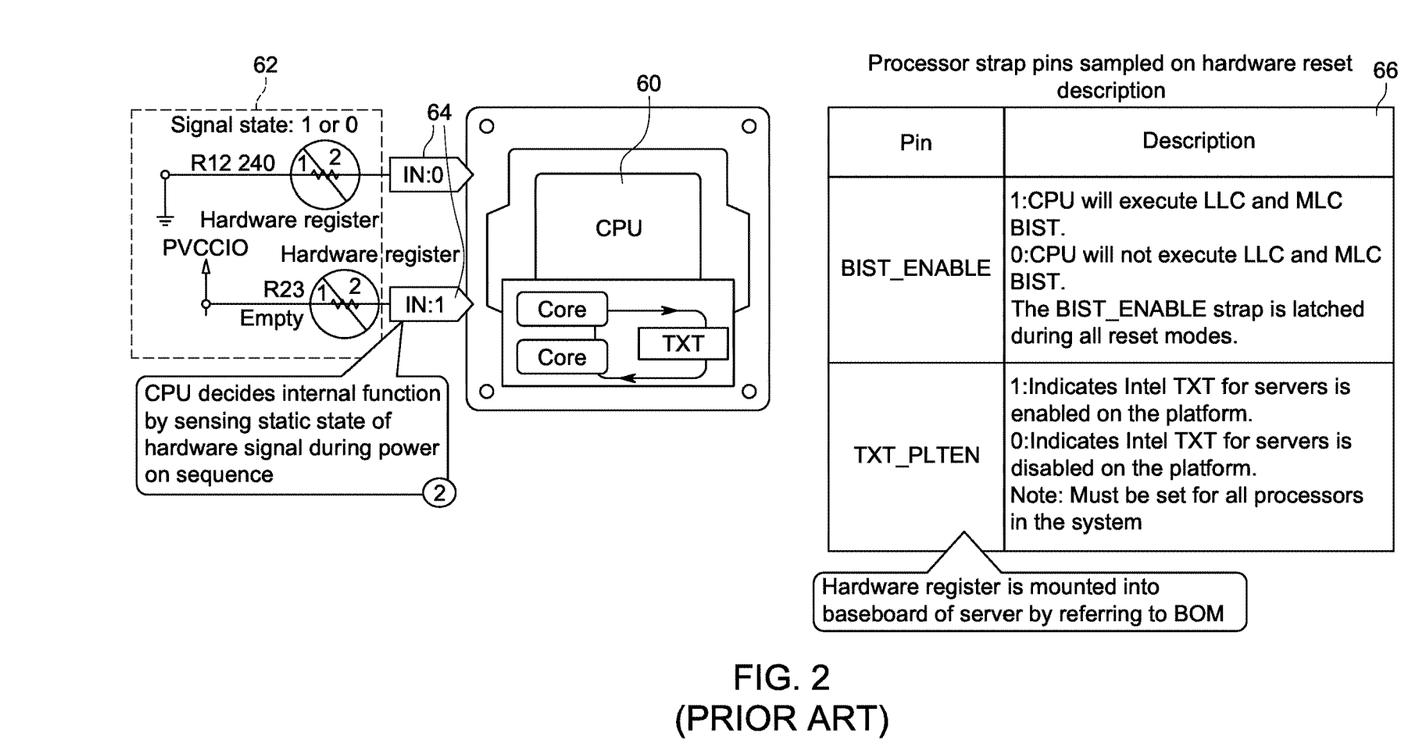
FIG. 2 is a block diagram of the prior art installation of hardware straps for a server.

Similarly, FIG. 2 shows a conventional configuration process of hardware settings for a processor that are termed "hardware straps." In this process, a processor 60 such as an Intel processor, includes input pins that define different functions that may be performed by the processor 60. The feature configuration of the processor 60 depends on the static state of a hardware input signal from a logic circuit 62 having hardware registers, that are connected to input pins 64. The logic circuit 62 is mounted on the baseboard of the server according to the customer bill of material in this example. A table 66 may include the static states constituting the hardware straps that configure the function of the processor 60. In this example, the functions of the processor 60 are determined by the state of the signals connected to the input pins 64 during the power on sequence.

Since the software straps and hardware straps shown in FIGS. 1 and 2 are static parameters and fixed states, modifying them may need extra coding, compiling, releasing, and strict processing of maintenance and after service if a variety of different function baseboards are desired. Such a process results in extended costs for maintenance of different revisions of a firmware image file for customer. Further, it requires a complicated process to modify the hardware logic circuit of a baseboard production line should new server designs with different functions be required.

Thus, there is a need for a streamlined process to allow production of different servers with different functions. There is a further need for flexible configuration to allow different server functions without modifying hardware logic circuits or rewriting firmware images.

SUMMARY

One disclosed example is a method to configure the functions of a server. Desired parameters and corresponding server identifications are stored in either a hardware or software straps structure in a firmware image. A board identification including a server product type is read from a memory on a baseboard. The server product type is compared the server identifications in the straps structure. The corresponding desired parameter is loaded to a baseboard component on the baseboard to perform a server function.

Another disclosed example is a configurable server including a memory that stores a board identification including a server product type. The server includes a basic input output system including a firmware image having a hardware strap structure. The hardware strap structure includes a plurality of desired parameters and corresponding server identifications. A logic circuit has outputs set according to hardware strap parameters, from one of the plurality of desired parameters having a server identification matching the server product type. A processor has configuration inputs to enable one of a plurality of functions. The processor performs a function of the plurality of functions based on the state of the configuration inputs. The configuration inputs are coupled to the outputs of the logic circuit.

Another disclosed example is a configurable server including a memory that stores a board identification including a server product type. The server includes a basic input output system including a firmware image having a software strap structure. The software strap structure includes a plurality of desired parameters and corresponding server identifications. A flash memory stores a software strap parameter, from one of the plurality of desired parameters having a server identification matching the server product type. A serial bus is coupled to a configurable hardware component. A platform hub controller is coupled to the flash memory. The platform hub controller reads the software strap parameter and sends configuration parameters on the serial bus to the configurable hardware component.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The above described method and system allows the production of different types of servers by providing a firmware image file having multiple hardware and software straps that correspond with different server types. On assembly, a Board ID field is read from a baseboard to determine the desired server type. The appropriate hardware and software straps are then copied from the firmware image file to configure the server for the appropriate functions. This process allows reduction in the required quantity of combination firmware image files released, and reduces the modifications of hardware logic circuits of baseboards for servers. Although the examples relate to servers, the principles described herein may be applied to any electronic product that may run the same firmware image on a motherboard which has different hardware change requirements that may now be automatically executed. These reductions allow many different server options during production without the need to add hardware or reprogram software.

Figure 3:
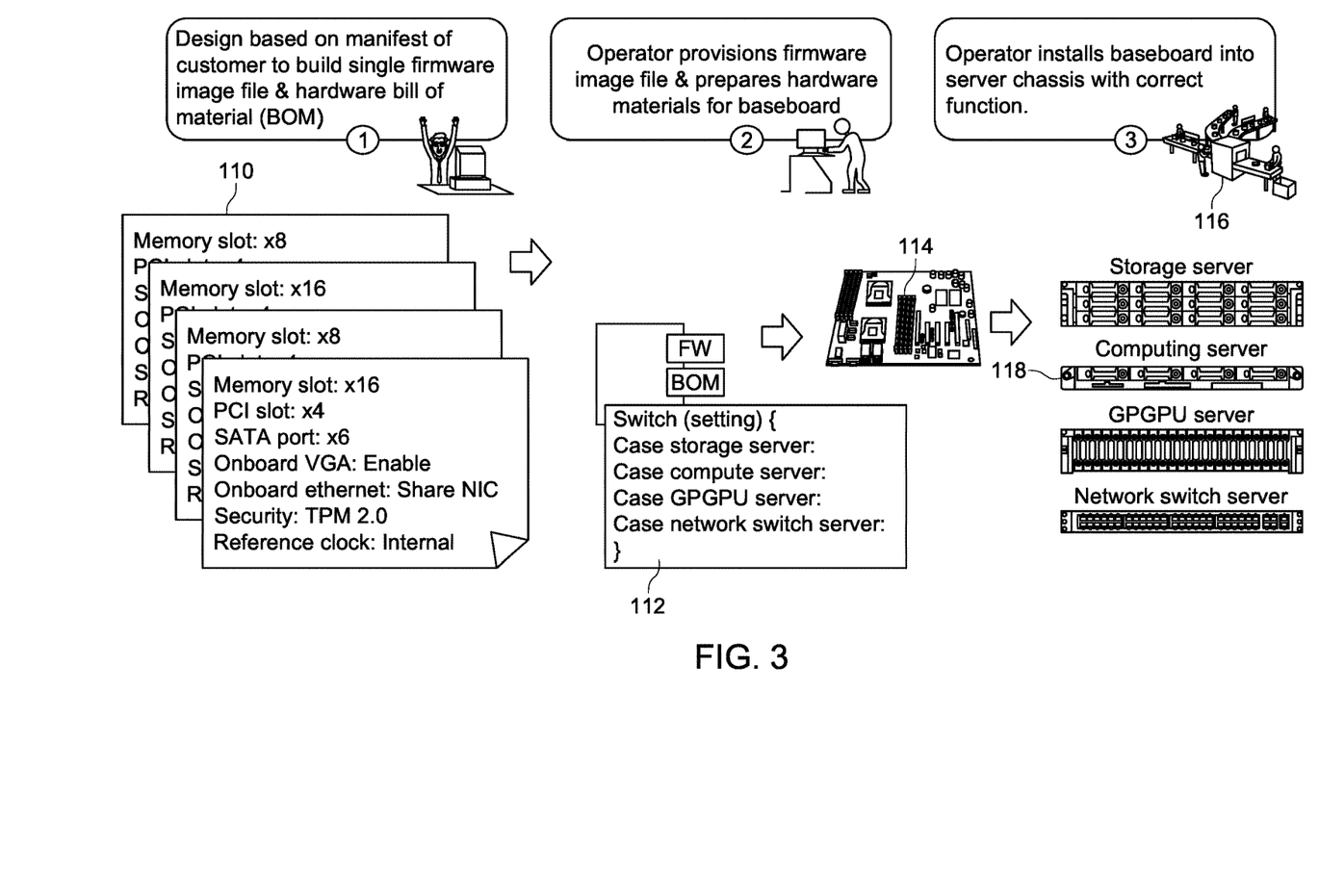
FIG. 3 is a flow diagram of an example server configuration and assembly process that allows efficient configuration for desired different types of servers.

FIG. 3 shows the process of an example of manufacturing different types of servers using the same baseboard and other components. The process includes authoring a comprehensive firmware image 110 that includes different modules of hardware and software straps for different types of servers. The comprehensive firmware image 110 decreases the quantity of combination firmware image file releases required for production of different types of servers. The process also reduces the modification of hardware logic circuits that specify functions by using a programmable logic controller (112). The comprehensive firmware image 110 is written into the memory of a baseboard (114). The production operator then installs the baseboard into a server chassis and the correct functions are selected based the desired type of server (116). The configuration parameters in the firmware image and a programmable logic controller allows the production of different servers 118 such as a storage server, a computational server, a GPU server, or a network switch server. Such production of the servers 118 does not require multiple firmware images or complex hardware logic circuits. The process also provides a mechanism to examine whether a baseboard has the correct provision of a combination firmware image and output of hardware logic for the requested server type. The present process incorporates a firmware algorithm in the comprehensive firmware image 110 to decrease the quantities of firmware image files released while still allowing different server designs to use common components such as the baseboard. The process also includes a flexible methodology to reduce the modifications of hardware registers residing on the baseboard for setting server processor functions.

Figure 4:
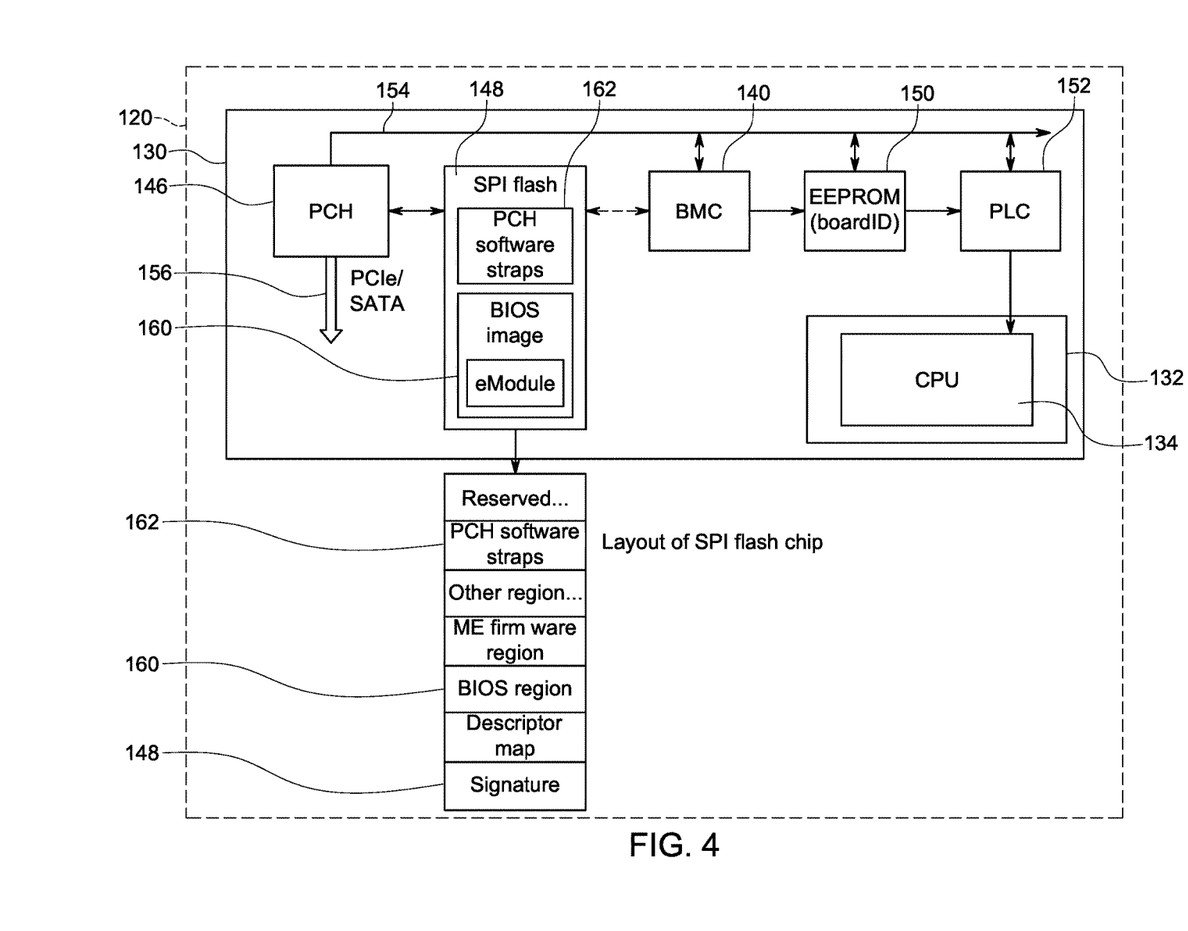
FIG. 4 is a block diagram of a baseboard for a server.

FIG. 4 is a block diagram of the hardware and memory devices in a server 120 that may be configured for directing different functions based on the type of server. The server 120 may be one of several types that each include common components such as a baseboard 130. For example, server types may include a storage server, a computational server, a GPU server, or a network switch server as explained above.

The server 120 includes the baseboard 130 and a mainboard 132. The mainboard 132 may include a processor 134 and other configurable devices. The baseboard 130 is an optimized design that accommodates maximum variable and independent requirements. A baseboard designer thus ideally considers all possible hardware components installed into a baseboard that may be used for different types of servers. The mainboard 132 may also include specialized components that are specific to the desired function of the type of server. For example, a mainboard for a GPU server would include multiple GPUs, while a mainboard for a storage server would include numerous solid state or hard disk drives. The baseboard 130 mounts a baseboard management controller (BMC) 140 and a BIOS for the baseboard management controller 140. The baseboard 130 also includes a platform controller hub (PCH) 146 and a service provider interface (hereinafter "SPI") flash chip 148. In this example, the PCH 146 includes an internal PCI root controller and an internal SATA controller. The baseboard 130 includes an identification memory such as an electrically erasable programmable read-only memory (hereinafter referred to as "EEPROM") 150. The identification data associated with the server 120 is stored in the EEPROM 150. The baseboard 130 also includes a platform logic controller 152. The platform logic controller 152 includes hardware registers that are connected to configuration inputs on the processor 134. Although, reference is made to the BIOS to perform various configuration functions, a Unified Extensible Firmware Interface (UEFI) could also perform the same functions. A system management bus 154 allows the components on the baseboard 130 to communicate with each other.

An example firmware algorithm of the BIOS of the baseboard management controller 140 reprograms the software straps parameters for the PCH 146 for different functions depending on a Board ID stored in the EEPROM 150. In this example, the Board ID includes certain server identification information, which may contain a unique signature, a product name, custom data, and a checksum field. The Board ID will therefore convey the type of server desired and the corresponding functions of the server. The BIOS includes a BIOS firmware image file 160 stored in an eModule in the SPI flash chip 148. The firmware image includes a variety of the desired software straps structure 162, which each are associated with one the possible Board IDs. The BIOS firmware image file 160 will build the PCH software straps inside the eModule of the BIOS as a structure termed "desired software straps." As will be explained below, the software strap parameters allow the PCH 146 to configure hardware components on the main board 132 via a serial bus 156, as either a SATA bus or a PCIe bus, by referencing the values of the software strap parameters to select the appropriate controller. The circuit routing is executed during the power on sequence by the platform controller hub 146.

With the correct Board ID of a desired type of server, the BIOS may read the Board ID to learn what type of server it is initializing during the power on sequence. The BIOS may then compare the software straps parameters stored on the SPI flash chip 148 to the desired software straps of the eModule. If the content between the software strap parameters and the desired software straps is different, this indicates the baseboard 130 is installed in a new server chassis type. In this case, the BIOS reprograms the software straps parameters of the SPI flash chip 148 to the desired software straps structure from the eModule. The BIOS will then trigger a hardware power cycle. The BIOS then will demand the PCH 146 to recognize the software straps parameters again and change the behavior of the baseboard hardware through the PCH 146. Thus, this algorithm adjusts the value of the software straps structure 162 of the SPI flash chip 148 through the SPI interface. This algorithm could be run by the BMC 140 if the BMC 140 has the capacity to access the SPI flash chip 148.

Figure 5:
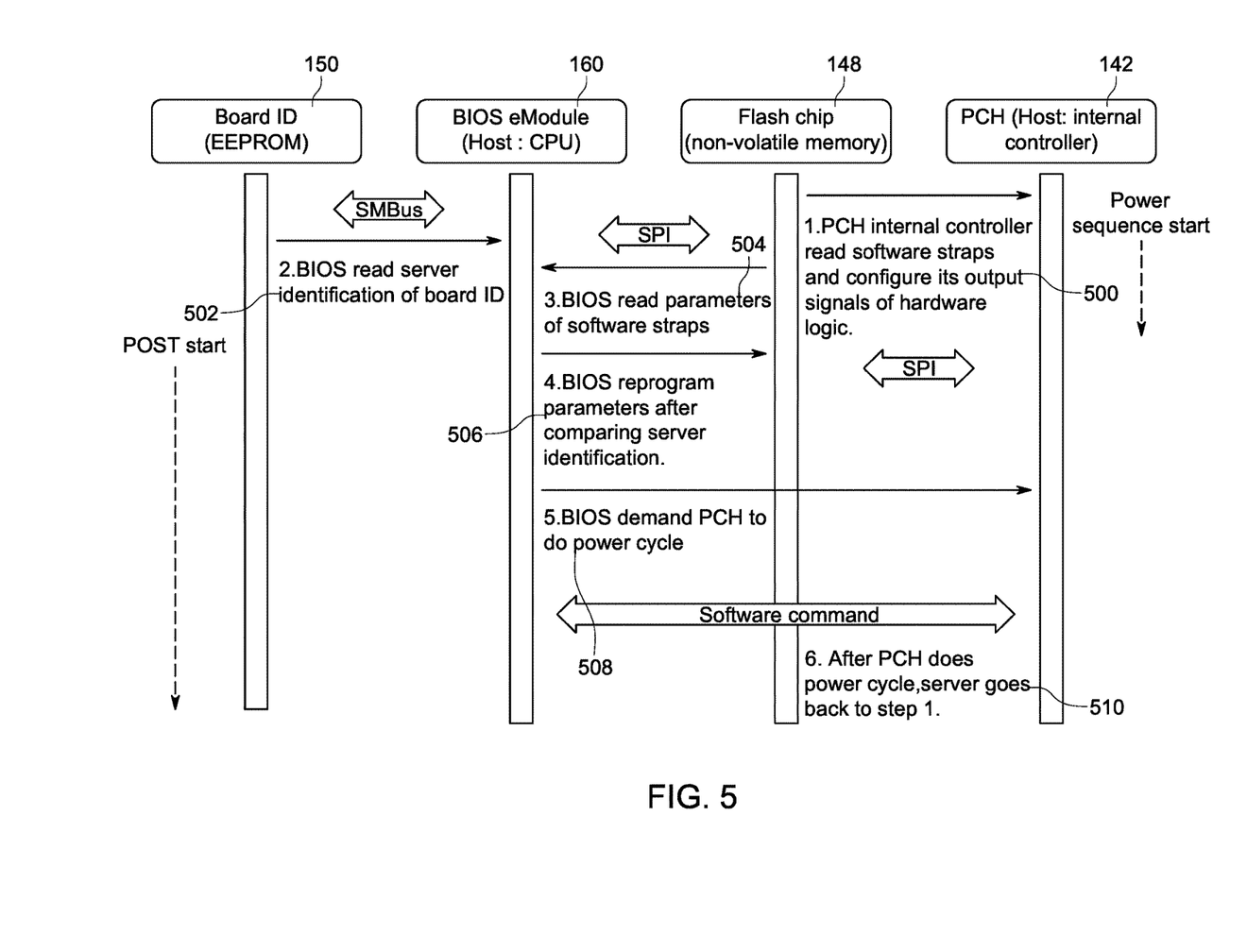
FIG. 5 is a diagram of the process of providing software strap configuration parameters for a server to a platform control hub.

FIG. 5 shows a flow diagram of the process of providing software straps parameters to produce a server with specific functions. On startup the internal controller of the PCH 146 in FIG. 4 reads the software straps from the SPI flash chip 148 and configures its hardware logic output signals (500). The BIOS of the BMC 140 reads the server identification field of the board ID stored in the EEPROM 150 (502). The BIOS then reads the parameters of the software straps from the BIOS eModule stored in the server host (504). The BIOS reprograms the software strap parameters after comparing the server identification to determine if the software strap parameters in the SPI flash chip 148 match those of the server identification (506). The BIOS will then control the PCH 146 to initiate the power cycle (508). After the PCH 146 performs a power cycle, the server will reset to read the software straps now stored in the SPI flash chip 148 (510).

Figure 6A:
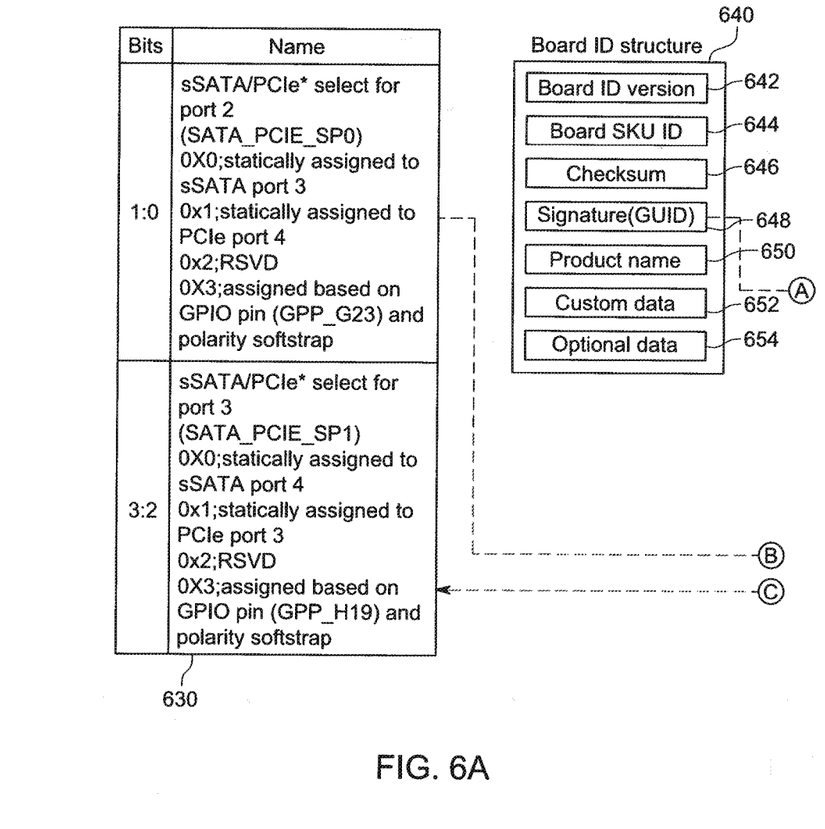
FIGS. 6A and 6B show a flow diagram of the process of providing software strap configuration parameters to the platform control hub.
Figure 6B:
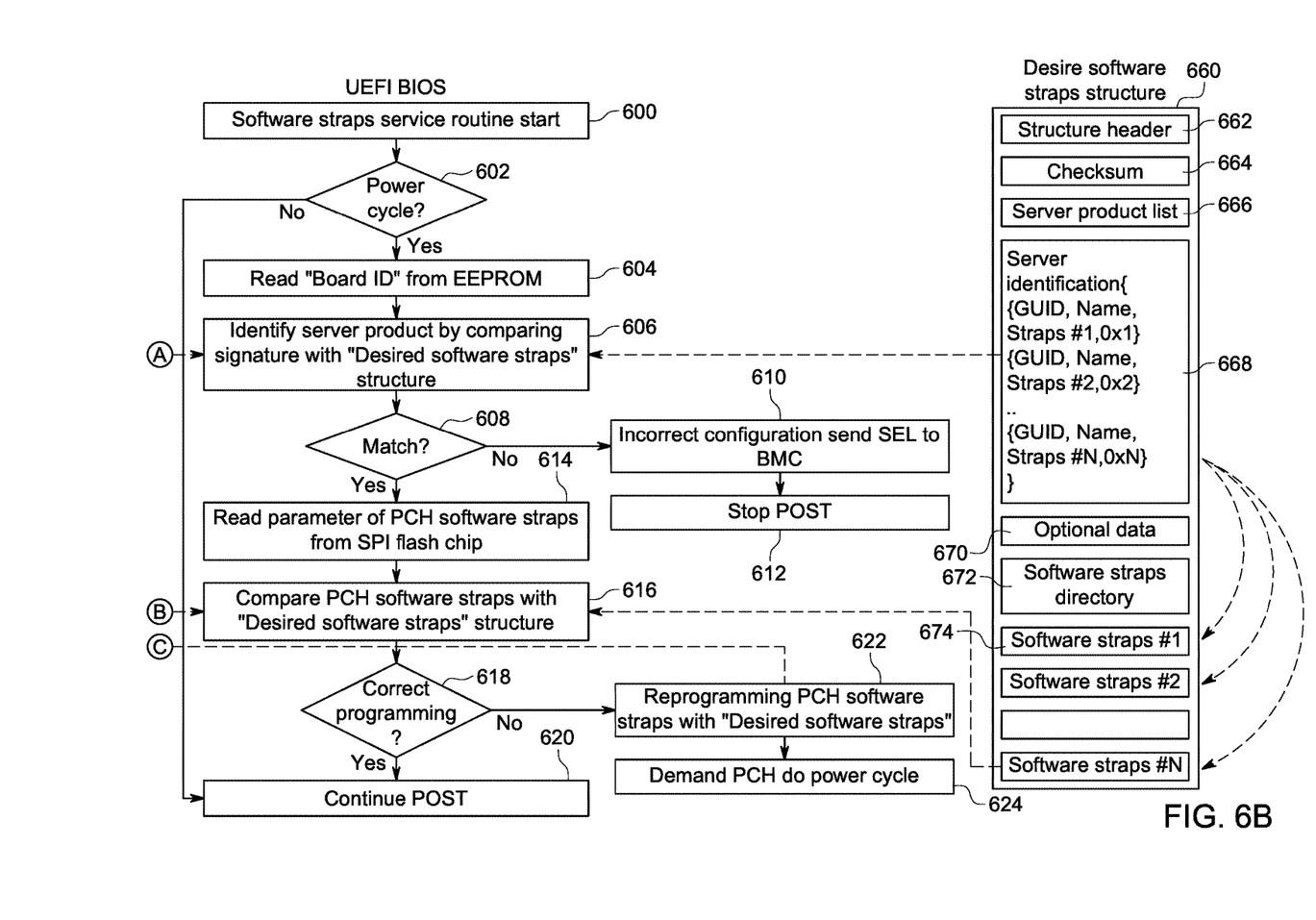

FIGS. 6A and 6B show a flowchart of the routine performed by the BIOS to compare and reprogram software strap parameters, as shown in FIG. 5. The BIOS first starts the software straps service routine (600). The BIOS then determines whether a power cycle has been initiated (602). If the power cycle has been initiated, the BIOS reads the Board ID from the EEPROM 150 (604). The BIOS identifies the desired server product by comparing the signature field from the Board ID with the server identifications listed in a desired software straps structure 162 stored in the SPI flash chip 148 shown in FIG. 4 (606). The software straps structure may also be stored in other entities inside the motherboard that are accessible by the BIOS.

The BIOS determines whether the signature from the Board ID matches any of the server identifications in the desired software straps structure (608). If the signature does not match any of the server identifications, there is an incorrect configuration, and the BIOS will send a system event log (SEL) to the BMC 140 (610). The BIOS will then stop the power on self-test routine (612). If there is a match of the signature (608), the BIOS reads the software straps parameter from the SPI flash chip 148 in FIG. 4 (614). The BIOS compares the software straps parameters with the desired software straps structure stored on the eModule (616). The BIOS determines whether the software straps read from the SPI flash chip 148 are correct by the comparison (618). If there is a match to the parameters associated with the signature in the desired software straps structure, the BIOS continues the power on self-test routine (620). If no match is found, the BIOS reprograms the software straps in the SPI flash chip 148 with the appropriate software straps from the desired software straps structure (622). The BIOS then sends a command for the PCH 146 to perform a power cycle (624).

FIG. 6A shows an example PCH software strap table 630 that may be stored in the SPI flash chip 148. The PCH software strap table 630 includes bits that define the configuration of different output ports of the PCH 146. As may be seen, the software strap table 630 includes output port configurations for either a SATA bus or a PCIe bus.

FIG. 6A also shows an example Board ID structure 640 that is stored in the EEPROM 150. The Board ID image 640 includes a board ID version field 642, a board SKU ID field 644, a checksum field 646, a signature field 648, a product name field 650, a custom data field 652, and an optional data field 654. The Board ID structure 640 is a data structure to describe identification of baseboard/server platform. The board ID version field 642 is the release version describing the schema of the structure. The board SKU ID field 644 is a unique number to describe the baseboard. The checksum field 646 is a hash value to record integrity of the structure for the factory build. The signature field 648 is a hash value to record the integrity of structure for security examination. The product name field 650 is a string to describe the system with different chassis types. The custom data field 652 is a field that may be used for a user specific setting.

FIG. 6B shows a desired software straps structure 660 that is stored in the eModule. The desired software straps structure 660 includes a structure header field 662, a checksum field 664, a server product list field 666, a server identifications field 668, an optional data field 670, and a software straps directory field 672. Various software strap parameters are stored in software strap parameter fields 674. The software straps directory 672 provides a map to the stored software straps in the software strap parameter fields 674. Each type of server is stored in the server identifications field 668 along with the corresponding identification of software strap parameters associated with the type of server.

The firmware algorithm of the baseboard BIOS may adjust the configuration of a programmable input/output (I/O) chip, such as the platform logic controller 152 in FIG. 4, based on the content of the Board ID. The output signal of the programmable I/O chip may be configured as open-drain and may provide an on resistance of 100Ω max in this example, since the state of the output signal must be consistently present to the processor 134. A consistent signal is necessary so the processor 134 may sample its input pins during the power on sequence. The processor 134 then initializes the link/function as well as an internal configuration controller register for different phases of the power on sequence. Similar to the desired software straps structure of the eModule, the BIOS firmware image file 160 may have a variety of hardware straps, which match with each potential Board ID. The hardware straps are built inside the BIOS as a "desired hardware straps" structure 660 as shown in FIG. 6B.

Figure 7:
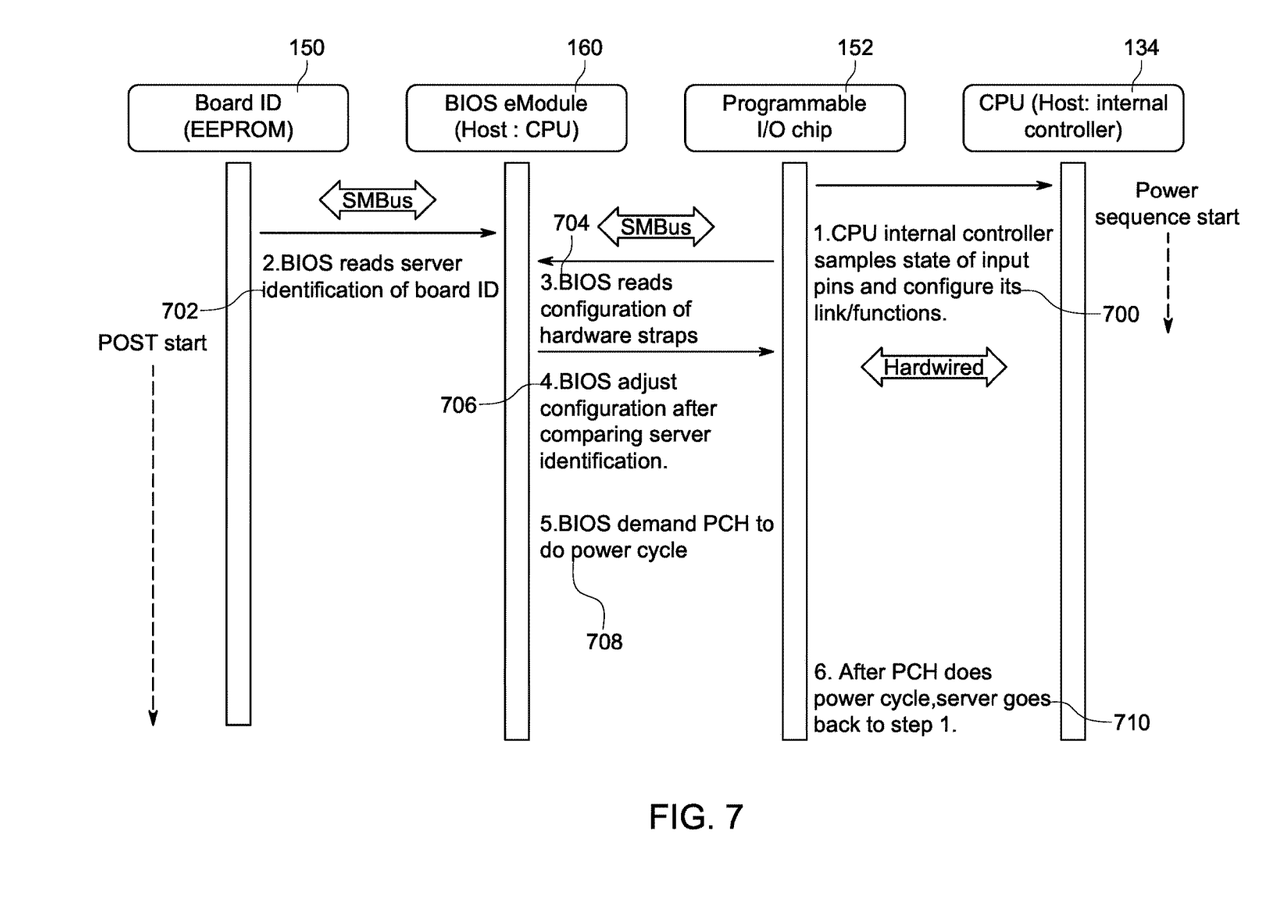
FIG. 7 is a diagram of the process of providing hardware strap configuration parameters for a server to hardware logic.

FIG. 7 shows a diagram of the process of providing hardware straps parameters to configure the processor of a server. On startup, the internal controller of the CPU 134 in FIG. 4 samples the state of its input pins and configures its link function (700). The BIOS or the BMC 140 reads the server identification field of the Board ID stored in the EEPROM 150 (702). The BIOS then reads the configuration of the hardware straps from the platform logic controller 152 (704). The BIOS sends a SMBus read command to the EEPROM 150 and then retrieves a block of board ID information including the server identification field. The BIOS adjusts the configuration after comparing the server identification to determine if the hardware strap configurations match those of the server identification (706). The BIOS will then control the PCH 146 to initiate the power cycle (708). After the PCH 146 performs a power cycle, the CPU 134 will reset and perform the functions as determined from the state of the input pins connected to the outputs of the platform logic controller 152 (710).

Figure 8A:
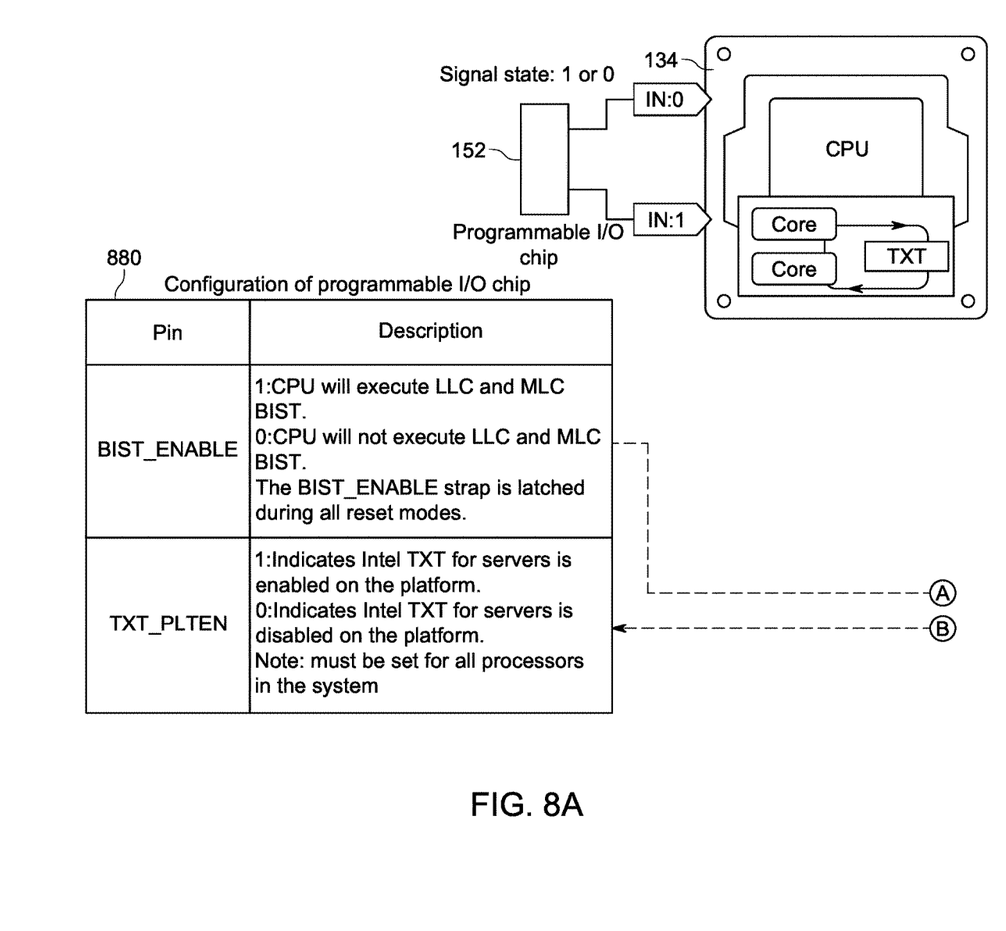
FIGS. 8A and 8B show a flow diagram of the process of providing hardware strap configuration parameters to hardware logic.
Figure 8B:
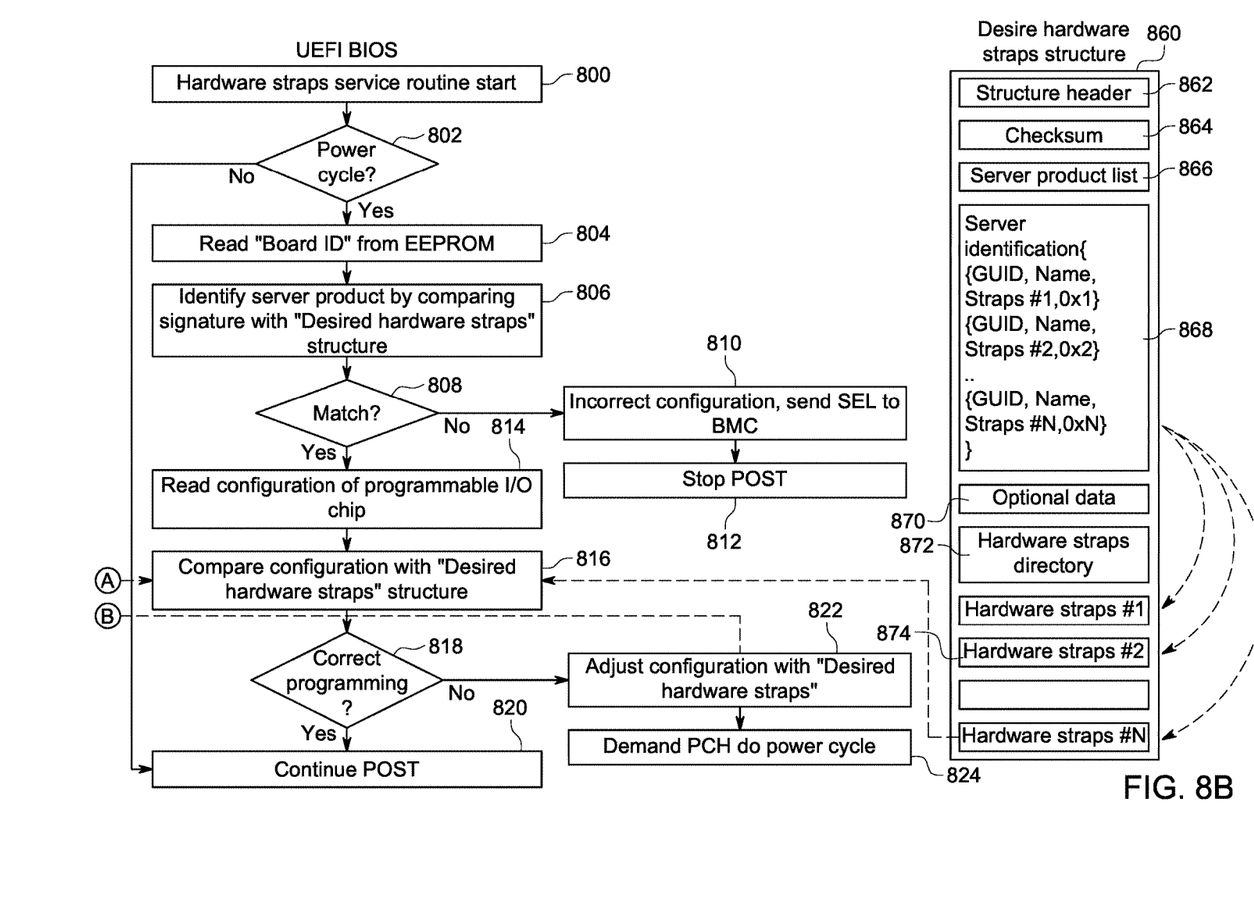

FIGS. 8A and 8B show a flowchart of the routine performed by the BIOS (in FIG. 4) to compare and reprogram hardware strap parameters as shown in FIG. 7. This routine may be run simultaneously with the routine described with reference to FIGS. 5, 6A, and 6B. The BIOS first starts the hardware straps service routine (800). The BIOS then determines whether a power cycle has been initiated (802). If the power cycle has been initiated, the BIOS reads the Board ID from the EEPROM 150 (804). The BIOS identifies the desired server product by comparing the signature field from the Board ID with the server identifications listed in a desired hardware straps structure stored in the BIOS eModule (806). The hardware straps structure may also be stored in other entities inside the motherboard that are accessible by the BIOS.

The BIOS determines whether the signature from the Board ID matches any of the server identifications in the desired hardware straps structure (808). If the signature does not match any of the server identifications, there is an incorrect configuration (and does not have current UEFI BIOS support), and the BIOS will send a system event log (SEL) to the BMC 130 (810). The BIOS will then stop the power on self-test routine (812). If there is a match of the signature (808) indicating the UEFI BIOS supports the motherboard, the BIOS reads the hardware straps parameters from the platform logic controller 152 (814). The BIOS compares the hardware straps parameters with the desired hardware straps structure stored on the eModule (816). The BIOS determines whether the hardware straps read from the platform logic controller 152 are correct by comparison result (818). If there is a match to the parameters associated with the signature in the desired hardware straps structure, the BIOS continues the power on self-test routine (820). If no match is found, the BIOS reprograms the hardware straps in the platform logic controller 152 with the appropriate hardware straps from the desired hardware straps structure (822). The BIOS then sends a command for the PCH 146 to perform a power cycle (824).

FIG. 8B shows an example of a desired hardware straps structure 860. The desired hardware straps structure 860 includes a structure header field 862, a checksum field 864, a server product list field 866, a server identifications field 868, an optional data field 870, and a hardware straps directory field 872. Various hardware strap parameters are stored in hardware strap parameter fields 874. The hardware straps directory 872 provides a map to the stored hardware straps in the hardware strap parameter fields 874. Each type of server is stored in the server identifications field 868 along with the corresponding correct stored software strap parameter field associated with the type of server. FIG. 8A shows a configuration table 880 that shows the state of the outputs of the platform logic controller 152 to the function input pins of the processor 134. The example configuration table 880 includes settings that allow a processor to active important features (e.g., LLC & MLC BIST, TXT). These features are enabled/disable by recognizing the signal high/low output from the programming I/O chip. The UEFI BIOS reads the setting value of the programming I/O chip and then compares the setting value with the hardware straps structure.

In order to prevent the wrong "Board ID" to be provisioned in a production line, the above algorithms both examine whether the signature of the Board ID matches the server identifications in the desired software or hardware structure. If there is not a match, the BIOS sends a system event log (SEL) to the BMC 140 for an alert and stops the power up self-test routine to prevent the server from running and initializing incorrect functions. Once the server is scheduled for mass production with a variety of uses for a customer, the operator of the production site may easily use a single firmware image file and the customer bill of materials to configure the correct functions on the server without changing the baseboard. The above described process reduces the workload of firmware reversion management, maintenance and release, as well as accounts for hardware modifications on a bill of materials.

The flow diagrams in FIGS. 6A-6B and FIGS. 8A-8B are representative of example machine readable instructions for the BMC 140 in FIG. 4 to provide the correct software and hardware configuration parameters. In these examples, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowcharts illustrated in FIGS. 6A-6B and FIGS. 8A-8B, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations, and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for configuring the functions of a server, the method comprising:
    storing a plurality of desired parameters and a corresponding plurality of server identifications as software straps on a service provider interface (SPI) flash chip;
    machine reading a board identification, including a desired server product type, from a memory on a baseboard;
    comparing the selected desired server product type with the corresponding plurality of server identifications in the software straps; and
    loading the corresponding desired parameters to a platform controller hub (PCH) to perform a server function.

2. The method of claim 1, wherein the memory is an electrically erasable programmable read-only memory (EEPROM).

3. The method of claim 1, wherein the loading step is to a platform controller hub located on a baseboard, and wherein the parameters are software straps to configure output signals of the platform controller hub over a serial bus to a mainboard.

4. The method of claim 1, wherein a basic input output system executes the reading, comparing and loading steps.

5. The method of claim 1, wherein a Unified Extensible Firmware Interface executes the reading, comparing and loading steps.

6. The method of claim 1, further comprising sending a system error log if none of the server identifications match the server product type.

7. The method of claim 6, further comprising stopping a power on self-test routine if none of the server identifications match the server product type.

8. The method of claim 1, wherein the software straps is stored in a firmware image in a basic input output system on the baseboard.

9. The method of claim 1, wherein the corresponding plurality of server identifications include one selected from the group consisting of a storage server, a computing server, a graphics processing unit (GPU) server and a network switch server.

10. A method for configuring the functions of a server, the method comprising:
    storing a plurality of desired parameters corresponding to a plurality of server product type identifications as hardware straps on a platform logic controller;
    machine reading server identifications stored in a memory;
    machine reading the configuration of the hardware straps from the platform logic controller;
    comparing a selected desired server product type identification to the hardware straps configurations to determine if the hardware straps configurations match those of the selected desired server product type identification; and, enabling/disabling logic circuit outputs to configuration inputs of a processor on a mainboard, and wherein the desired parameters are hardware parameters to set the state of the outputs of the logic circuit.

11. The method of claim 10, wherein the memory is one selected from the group consisting of an electrically erasable programmable read-only memory (EEPROM) and a basic input output operating system eModule.

12. A configurable server comprising:
    a memory storing a board identification including a plurality of server product types, wherein the plurality of server product types shares common components;
    a basic input output system including a firmware image having a hardware strap structure including a plurality of desired parameters and corresponding server identifications;
    a logic circuit having outputs set according to hardware strap parameters from one of the plurality of desired parameters having a server identification matching the server product type; and
    a processor having configuration inputs to enable one of a plurality of functions, the processor performing a function of the plurality of functions based on the state of the configuration inputs, wherein the configuration inputs are coupled to the outputs of the logic circuit.

13. The server of claim 12, wherein the memory is an electrically erasable programmable read-only memory (EEPROM).

14. The server of claim 12, wherein the logic circuit is a programmable logic controller.

15. The server of claim 12, wherein the memory and the basic input output system are mounted on a baseboard and the processor is mounted on a mainboard.

16. A configurable server comprising:
    a memory, the memory storing a board identification including a desired server product type;
    a basic input output system, the basic input output system including a firmware image, the firmware image including a plurality of desired parameters and corresponding server identifications;

a flash memory storing a software strap parameter from one of the plurality of desired parameters having a server identification matching the server product type;

a configurable hardware component;

a serial bus coupled to the configurable hardware component; and a platform hub controller coupled to the flash memory, the platform hub controller reading the software strap parameter and sending configuration parameters on the serial bus to the configurable hardware component.

17. The server of claim 16, wherein the memory is an electrically erasable programmable read-only memory (EEPROM).

18. The server of claim 16, further comprising a baseboard mounting the memory, basic input output system, flash memory and platform hub controller and a mainboard mounting the configurable hardware component.

\* \* \* \* \*